(12) United States Patent
Salazar

(10) Patent No.: US 10,896,393 B2
(45) Date of Patent: Jan. 19, 2021

(54) AUTONOMIC CONTROL OF CALIBRATION FOR POINTING DEVICE

(75) Inventor: Fernando Salazar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2808 days.

(21) Appl. No.: 11/612,988

(22) Filed: Dec. 19, 2006

(65) Prior Publication Data

US 2008/0147418 A1   Jun. 19, 2008

(51) Int. Cl.
*G06Q 10/06* (2012.01)

(52) U.S. Cl.
CPC .............. *G06Q 10/06316* (2013.01)

(58) Field of Classification Search
CPC .............................. G06Q 10/06316
USPC ...................................... 705/7.26
See application file for complete search history.

(56) References Cited

U.S. PATENT DOCUMENTS

| | | | | |
|---|---|---|---|---|
| 6,505,166 | B1 * | 1/2003 | Stephanou | 705/7.14 |
| 6,507,821 | B1 * | 1/2003 | Stephanou | 705/7.14 |
| 6,513,013 | B1 * | 1/2003 | Stephanou | 705/7.14 |
| 6,799,210 | B1 * | 9/2004 | Gentry et al. | 709/223 |
| 7,099,933 | B1 * | 8/2006 | Wallace et al. | 709/223 |
| 7,353,230 | B2 * | 4/2008 | Hamilton et al. | 705/8 |
| 7,668,171 | B2 * | 2/2010 | Bondarenko et al. | 370/395.1 |
| 7,711,653 | B1 * | 5/2010 | Denham et al. | 705/304 |
| 7,886,009 | B2 * | 2/2011 | Faber et al. | 709/206 |
| 2003/0163380 | A1 * | 8/2003 | Vaccarelli et al. | 705/26 |
| 2004/0044585 | A1 * | 3/2004 | Franco | G06Q 30/016 705/304 |
| 2005/0172170 | A1 * | 8/2005 | Thieret et al. | 714/37 |
| 2008/0056233 | A1 * | 3/2008 | Ijidakinro | H04L 29/06027 370/352 |
| 2008/0147418 | A1 * | 6/2008 | Salazar | 705/1 |

OTHER PUBLICATIONS

Duffield, N.G., et al; A Flexible Model for Resource Management in Virtual Private Networks; SIGCOMM, Aug. 1999.

Mainwaring; Alan, et al; Design Challenges of Virtual Networks: Fast, General-Purpose Communication; PPoPP, Atlanta. Georgia; May 1999.

* cited by examiner

*Primary Examiner* — Charles Guiliano
(74) *Attorney, Agent, or Firm* — Robert C. Bunker

(57) ABSTRACT

Embodiments of the present invention address deficiencies of the art in respect to SOA virtualization and provide a novel and non-obvious method, system and computer program product for service endpoint virtualization and dynamic dependency management. In one embodiment of the invention, a method for service endpoint visualization and dynamic dependency management can be provided. The method can include issuing a ticket in lieu of a service endpoint to a querying client for an identified service, subsequently redeeming the ticket with a service endpoint to an instance of the identified service, and re-redeeming the ticket at a later time to provide a service endpoint to a different instance of the identified service.

14 Claims, 2 Drawing Sheets

AUTONOMIC CONTROL OF CALIBRATION FOR POINTING DEVICE

BACKGROUND OF THE INVENTION

Field of the Invention

The present invention relates to the field of component based distributed computing and more particularly to component based distributed computing in a service oriented architecture (SOA) environment.

Description of the Related Art

It is now a common trend that business oriented applications are produced from one or more components which can be individually re-used to create business processes for different solutions. Each of these components can expose itself as a set of reusable business functions, also referred to as "services" comporting with computing standards for deploying enterprise level logic that facilitate an open service oriented architecture (SOA). An SOA essentially can be defined as a system where all exposed business and technical functions are in the form of reusable services. These reusable services can be accessed by a wide range of clients and can communicate with each other to engage either in simple data passing between two or more services, or in activity coordination by two or more services.

In an SOA, a client can invoke an operation on a service to perform a function and, optionally the client can receive a response. Invoked services are generally business functions configured to fulfill the needs of business customers, whether those customers are individual consumers or other businesses. In the example of a commerce application, the functions can be grouped into various services where each service can specialize in functions such as catalog management, shopping cart management, credit card transaction processing, sales tax computation and the like. By utilizing an SOA, services in such a solution can easily interoperate with other business processes in a larger solution involving one or more separate business entities and one or more separate consumer entities. The entire solution can also evolve and adapt, adding or changing some functions without displacing others. This is because the service access is based on standards and interfaces, and not on proprietary dependencies.

SOAs are based on loose coupling between service providers and service consumers. Connections between providers and consumers are negotiated based on interfaces rather than implementations. These connections are ideally made using a late binding approach, where a needed provider endpoint address is resolved at runtime with the aid of a registry such as the Universal Description, Discovery and Integration (UDDI) registry. Specifically, an important benefit of SOA is the ability to realize service virtualization. In virtualization, service consumers bind to virtual endpoints; then some logic or mechanism in the virtual endpoint ultimately resolves a connection to a desired, concrete endpoint. The value of virtualization is that services are defined logically, allowing clients to bind to a single, unchanging entity, while the actual functional service implementation can be redirected or changed at any time.

The SOA approach implicitly creates new requirements for management of systems. In an open environment, with large numbers of providers and consumers and the ability to easily make connections between any two endpoints, the logical links that comprise the overall system can easily grow in number. Each of these links represents a dependency that potentially requires management. Since the links are so easy to establish, new dependencies can arise at any time. Some dependencies may be long-lived, some temporary, and some intermittent. In managing such a wide range of dependency types, it is unlikely that a single, formal or process-oriented system can be successful.

BRIEF SUMMARY OF THE INVENTION

Embodiments of the present invention address deficiencies of the art in respect to SOA virtualization and provide a novel and non-obvious method, system and computer program product for service endpoint virtualization and dynamic dependency management. In one embodiment of the invention, a method for service endpoint visualization and dynamic dependency management can be provided. The method can include issuing a ticket in lieu of a service endpoint to a querying client for an identified service, subsequently redeeming the ticket with a service endpoint to an instance of the identified service, and re-redeeming the ticket at a later time to provide a service endpoint to a different instance of the identified service.

In one aspect of the embodiment, issuing a ticket in lieu of a service endpoint to a querying client for an identified service can include receiving a query for a service type, locating a ticket for the service type, and returning the located ticket to the querying client. Furthermore, returning the located ticket to the querying client further can include determining expiration information for the ticket and embedding the expiration information in the ticket. In another aspect of the embodiment, the method can include expiring the ticket after a duration specified by the expiration information, and requiring a new ticket redemption for the service endpoint for the identified service.

Notably, subsequently redeeming the ticket with a service endpoint to an instance of the identified service can include receiving the ticket from the querying client, locating a service endpoint to an instance of the identified service, extracting a callback for the querying client and storing the extracted callback for later retrieval, and returning the service endpoint to the querying client. In this regard, the method also can include detecting a change in the instance of the identified service, and notifying the querying client through the callback that a new ticket redemption for a new service endpoint for a different identified service is required.

In another embodiment of the invention, a service endpoint binding data processing system can be provided. The system can be configured for service endpoint visualization and dynamic dependency management and can include a registry interface to a registry of service endpoints for different services in an SOA component based system, and a virtualization server coupled to the registry interface. The virtualization server can include program code enabled to issue a ticket in lieu of a service endpoint to a querying client for an identified one of the services, to subsequently redeem the ticket with a service endpoint to an instance of the identified service, and to re-redeem the ticket at a later time to provide a service endpoint to a different instance of the identified service.

The system further can include a data store of callback addresses for different querying clients bound to different service endpoints for the different services. In the latter circumstance, the virtualization server can include program code enabled to notify a selected one of the different querying clients to refresh a respective ticket through a corresponding callback in the data store for the selected one of the different querying clients.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for service endpoint visualization and dynamic dependency management. In accordance with an embodiment of the present invention, a registry interface for a service registry can manage access to a requested service through the issuance of a service ticket providing a time limited binding endpoint for a service. Upon issuing a service ticket within the binding endpoint to a requesting client, the registry interface can record a callback to the requesting client. Subsequently, run-time changes in the binding endpoint can be managed by issuing a notice to the callback and by issuing a new ticket referencing a new binding endpoint.

Figure 1:
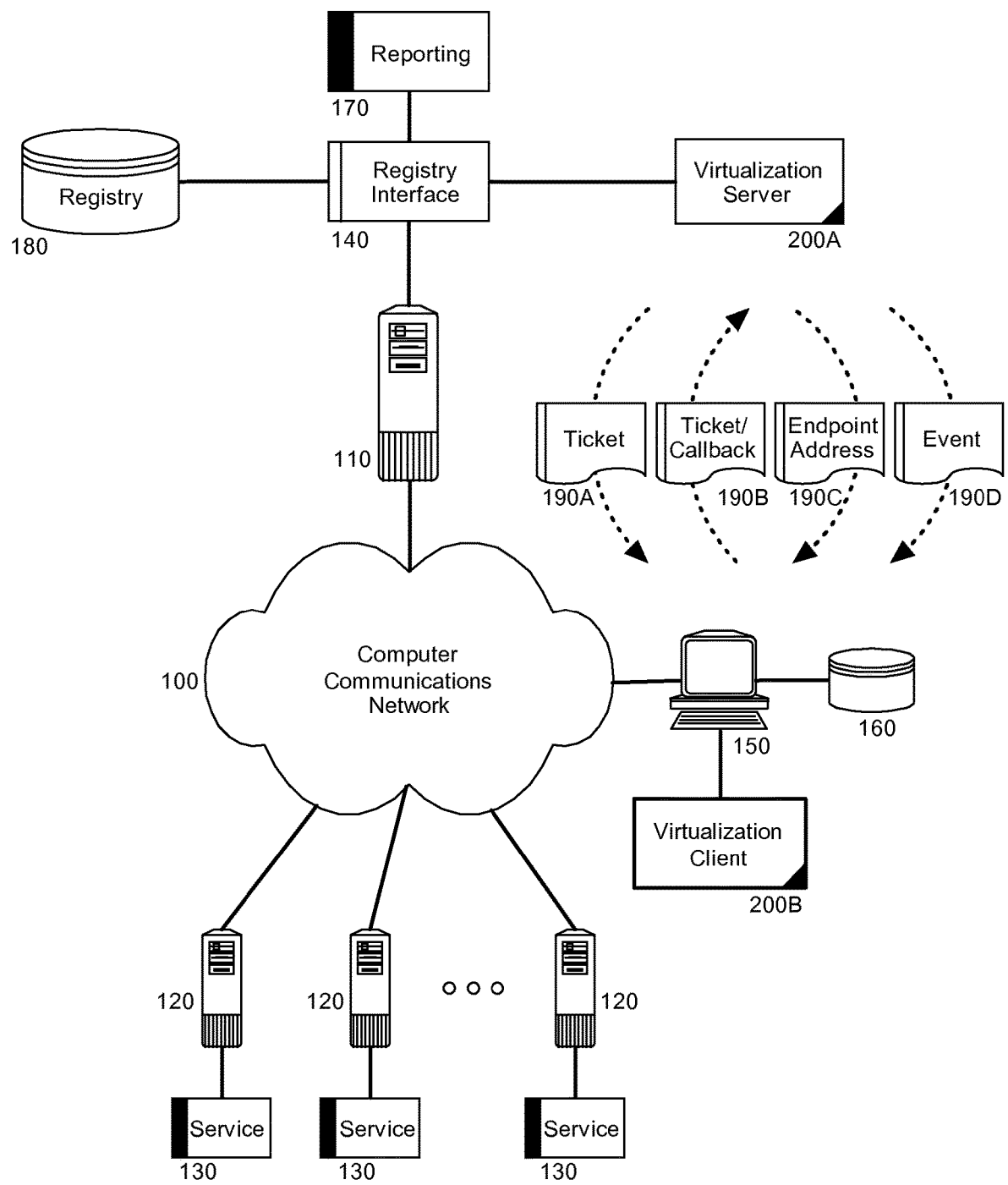
FIG. 1 is a schematic illustration of a service endpoint binding data processing system configured for service endpoint visualization and dynamic dependency management; and, FIGS. 2 through 5, taken together, illustrate a process for service endpoint visualization and dynamic dependency management.
Figure 2:
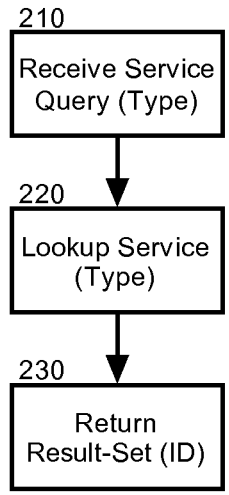
Figure 3:
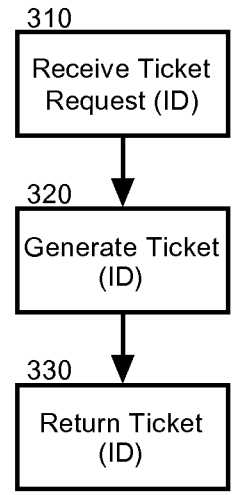

In further illustration, FIG. 1 is a schematic illustration of a service endpoint binding data processing system configured for service endpoint visualization and dynamic dependency management. The system can include a host computing platform 110 supporting the operation of a registry interface 140 to a registry 180 of service endpoints for different services in an SOA architected system. The host computing platform 110 can be communicatively coupled to multiple different service hosts 120 over a computer communications network 100, each of the service hosts 120 supporting the operation of a corresponding service 130.

The registry interface 140 can provide query access to the registry 180 on behalf of communicatively coupled querying clients 150 over the computer communications network 100. In this regard, the registry interface 140 can be configured to receive a query for a service type and to locate a corresponding service endpoint for the service type in the registry 180. Notably, a virtualization server 200A can be coupled to the registry interface 140 as a corresponding virtualization client 200B can be coupled to the querying client 150. In concert together, the virtualization server 200A and virtualization client 200B can implement service endpoint visualization and dynamic dependency management.

Specifically, instead of the registry interface 180 returning to the querying client 150 a direct binding to a particular one of the services 130 in response to a service query, the virtualization server 200A can return to the querying client 150 a ticket 190A for the particular one of the services 130. The ticket 190A can be time lapsing such that after the expiration of a specified period, the querying client 150 will be required to refresh the ticket 190A. In any event, the virtualization client 200B in the querying client 150 can store the ticket 190A in memory 160 and, when requiring a binding to the particular one of the services 130, the virtualization client 200B can forward a combined ticket/callback 190B to the virtualization server 200A. The combined ticket/callback 190B can include both the ticket 190A and a callback address for the querying client 150.

Upon receiving the ticket/callback 190B, the virtualization server 200A can store the callback address in association with the querying client 150 and can return a valid endpoint address 190C to the virtualization client 200B which in turn can bind to the particular one of the services 130 using the endpoint address 190C. Subsequently, when a change to the binding of the particular one of the services 130 is required, the virtualization server 200A can forward a change event 190D to the virtualization client 200B. The virtualization client 200B, in turn, can reissue the ticket/callback 190B in order to receive a new endpoint address 190C for a different one of the services 130 to which to bind.

Finally, reporting logic 170 can be coupled to the registry interface 140. The reporting logic 170 can include program code enabled to report on the number and identity of querying clients 150 dependent upon a particular one of the services 130. Additionally, the program code of the reporting logic 170 can be enabled to provide statistics as to the pattern of tickets redeemed by different query clients 150 and also a classification of the different querying clients 150. Using reports generated by the reporting logic 170, tickets 190A can be invalidated not only for individual querying clients 150, but also for whole classes of querying clients 150. Likewise, different tickets 190A can be issued for different classes of querying clients 150.

In yet further illustration, FIGS. 2 through 5, taken together, illustrate a process for service endpoint visualization and dynamic dependency management. Beginning in block 210 of FIG. 2, a service query can be received from a querying client for a particular service type. In block 220, a service can be located in the registry corresponding to the service type. Thereafter, an identifier for the located service can be returned in a result set to the querying client along with descriptive information pertaining to the located service. In block 310 of FIG. 3, a ticket request can be received from a querying client for the identifier previously provided for the service type. In block 320, a ticket can be generated for the service identifier for the querying client and returned to the querying client in block 330.

Figure 4:
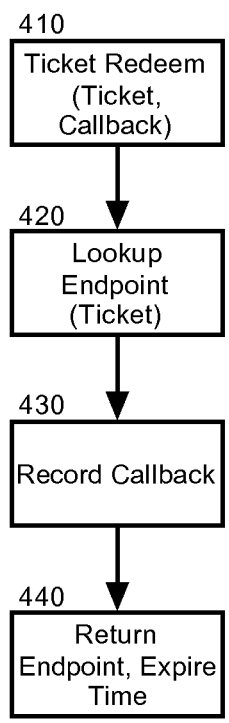

In block 410 of FIG. 4, a ticket can be provided by a querying client in association with a particular service. In block 420, an endpoint can be located corresponding to the ticket. Importantly, in block 430 a callback address can be extracted from the ticket for the querying client and stored in association with the querying client. Thereafter, the located endpoint and expiration information can be returned to the querying client in block 440. In this regard, the expiration information can include an expiration time or date, or a period of time during which the ticket is considered valid and subsequent to which a refreshed ticket will be required.

Figure 5:
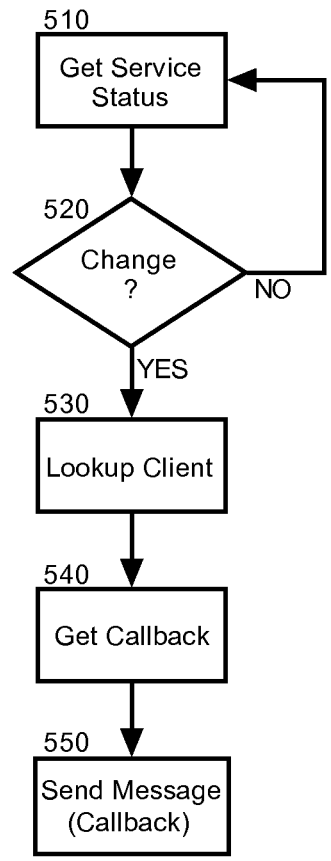

In block 510 of FIG. 5, the status of an endpoint for a service bound to one or more dependent querying clients can be determined. In decision block 520, if the status indicates that a change in binding for the service is required, in block 530, each dependent client can be identified for the binding and in block 540, the callbacks for each identified dependent client can be retrieved. Finally, in block 550, each dependent client can be notified through the callback that a change in binding is required in response to which each dependent client can resubmit the ticket in exchange for a new endpoint for binding.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for service endpoint visualization and dynamic dependency management, the method comprising:
receiving a query for a service type from a communicatively coupled querying client;
consulting a registry through a registry interface utilizing the service type in order to identify in the registry a corresponding service endpoint address for the service type;
issuing by a virtualization server executing in memory of a computer and binding service consumers to virtual endpoints, a ticket to the querying client instead of returning to the querying client the located corresponding service endpoint address;
subsequently receiving in the virtualization server, the ticket issued to the querying client and in response, storing a callback address provided with the ticket in association with the querying client and providing to the querying client the corresponding service endpoint address for use by the querying client to bind in the querying client the service type to a service accessible at the corresponding service endpoint address; and,
upon detecting a change for the corresponding service endpoint address, using the callback address to notify the querying client of the change, the querying client in response re-redeeming the ticket at a later time to receive a different service endpoint address for the service type.

2. The method of claim 1, wherein issuing a ticket comprises:
receiving a query for a service type;
locating a ticket for the service type; and,
returning the located ticket to the querying client.

3. The method of claim 2, wherein returning the located ticket to the querying client, further comprises:
determining expiration information for the ticket; and,
embedding the expiration information in the ticket.

4. The method of claim 2, further comprising:
expiring the ticket after a duration specified by the expiration information; and,
requiring a new ticket redemption for the service endpoint for the identified service.

5. The method of claim 1, further comprising reporting on querying clients dependent upon the instance of the identified service.

6. The method of claim 5, wherein reporting on querying clients dependent upon the instance of the identified service, comprises classifying the querying clients.

7. The method of claim 6, further comprising notifying a class of querying clients through respective callbacks for each of the querying clients that a new ticket redemption for the service endpoint for the identified service is required.

8. A computer program product comprising a non-transitory computer usable medium having computer usable program code for service endpoint visualization and dynamic dependency management, the computer program product including:
computer usable program code for receiving a query for a service type from a communicatively coupled querying client;
computer usable program code for consulting a registry through a registry interface utilizing the service type in order to identify in the registry a corresponding service endpoint address for the service type;
computer usable program code for issuing by a virtualization server executing in memory of a computer and binding service consumers to virtual endpoints, a ticket to the querying client instead of returning to the querying client the located corresponding service endpoint address;
computer usable program code for subsequently receiving in the virtualization server, the ticket issued to the querying client and in response, storing a callback address provided with the ticket in association with the querying client and providing to the querying client the corresponding service endpoint address for use by the querying client to bind in the querying client the service type to a service accessible at the corresponding service endpoint address; and, computer usable program code for, upon detecting a change for the corresponding service endpoint address, using the callback address to notify the querying client of the change, the querying client in response re-redeeming the ticket at a later time to receive a different service endpoint address for the service type.

9. The computer program product of claim 8, wherein the computer usable program code for issuing a ticket, comprises:

computer usable program code for receiving a query for a service type;

computer usable program code for locating a ticket for the service type; and, computer usable program code for returning the located ticket to the querying client.

10. The computer program product of claim 9, wherein the computer usable program code for returning the located ticket to the querying client, further comprises:

computer usable program code for determining expiration information for the ticket; and, computer usable program code for embedding the expiration information in the ticket.

11. The computer program product of claim 9, further comprising:

computer usable program code for expiring the ticket after a duration specified by the expiration information; and, computer usable program code for requiring a new ticket redemption for the service endpoint for the identified service.

12. The computer program product of claim 8, further comprising computer usable program code for reporting on querying clients dependent upon the instance of the identified service.

13. The computer program product of claim 12, wherein the computer usable program code for reporting on querying clients dependent upon the instance of the identified service, comprises computer usable program code for classifying the querying clients.

14. The computer program product of claim 13, further comprising computer usable program code for notifying a class of querying clients through respective callbacks for each of the querying clients that a new ticket redemption for the service endpoint for the identified service is required.

* * * * *